G. W. WELLS.
MOVABLE SEAT FOR VEHICLES.
APPLICATION FILED FEB. 3, 1915. RENEWED JUNE 3, 1916.
1,201,900.
Patented Oct. 17, 1916.
2 SHEETS—SHEET 1.
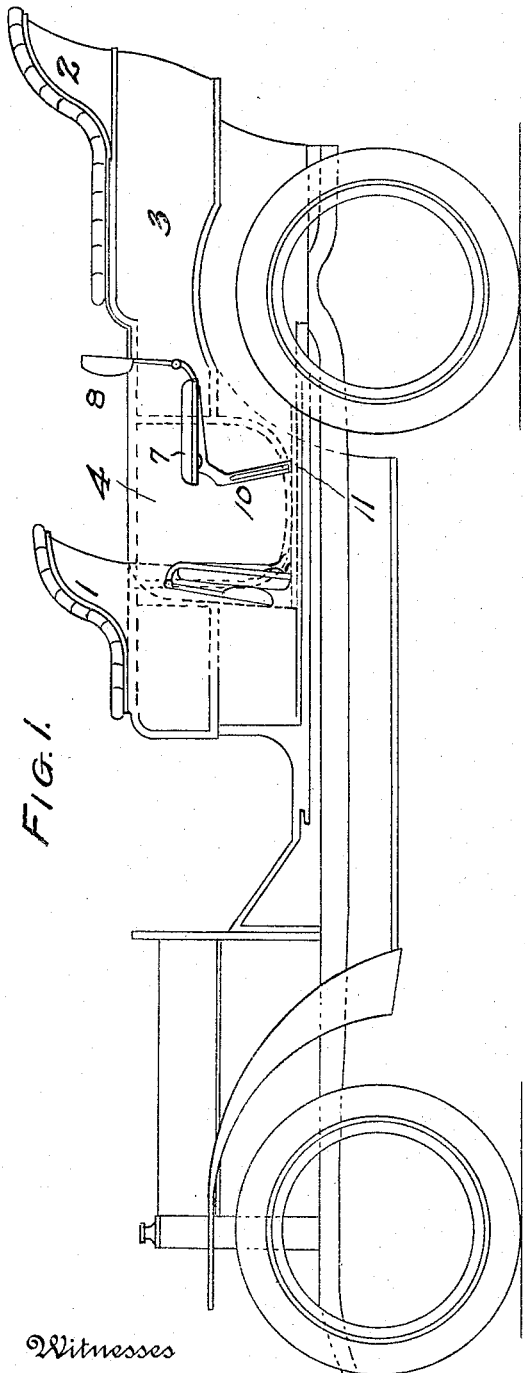
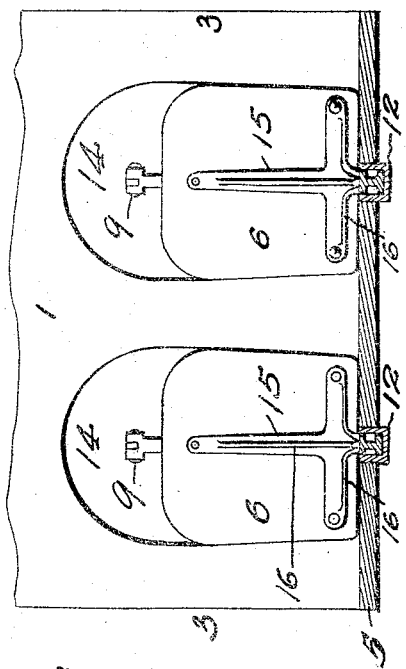
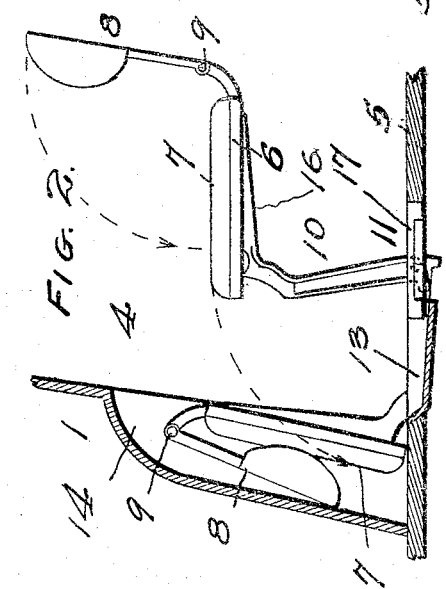
Witnesses
C. K. Davis
J. H. Adriaans
Inventor
George W. Wells,
By F. E. Stebbins
Attorney

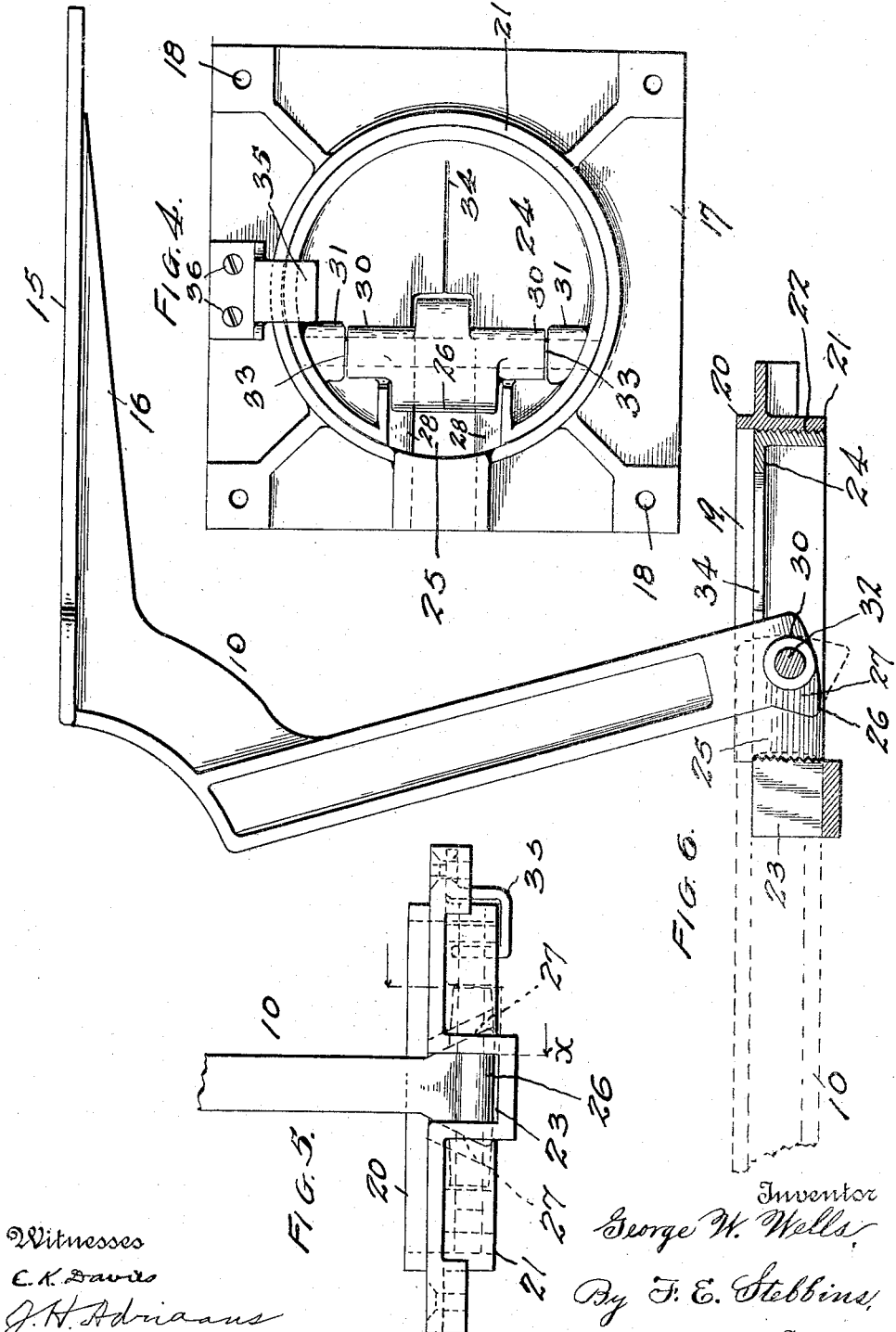

UNITED STATES PATENT OFFICE.

GEORGE W. WELLS, OF AMESBURY, MASSACHUSETTS.

MOVABLE SEAT FOR VEHICLES.

1,201,900.  Specification of Letters Patent.  Patented Oct. 17, 1916.

Application filed February 3, 1915, Serial No. 5,865. Renewed June 3, 1916. Serial No. 101,643.

*To all whom it may concern:*

Be it known that I, GEORGE W. WELLS, a citizen of the United States, residing at Amesbury, in the county of Essex and State of Massachusetts, have invented certain new and useful Improvements in Movable Seats for Vehicles, of which the following is a specification.

The invention relates to movable seats, and in particular to such as are adapted for location and use between the fixed front and rear seats of automobiles and other vehicles.

One object of the invention is the provision of a single seat, or two seats located side by side, which can be moved from a position or positions adapted for occupancy to a position or positions at the rear of the front seat and thus open a free and unobstructed passageway between the rear fixed seat and one or both of the doors or entrances at the side or sides of the vehicle; said seats to be of such construction that very little manipulation will be necessary to change a seat from one position to the other.

A further object is the provision of a seat or seats which can bodily be turned or rotated about an axis or axes so as to face in any desired direction and still be adapted to be moved to open a substantially free and unobstructed passageway as hereinbefore specified.

The invention consists in certain novelties of construction and combinations and arrangements of parts as herein set forth and specified in the claims.

The accompanying drawings illustrate an example of the embodiment of the invention constructed according to the best mode of procedure I have so far devised for the practical application of the principle.

Figure 1 is a side view in elevation of an automobile showing the relative disposition of my improved seats, one in position for use and the other turned down adjacent to the back of the front seat. Fig. 2 is an enlarged side view in elevation showing movable seats and a front seat. Fig. 3 is an elevation view of the back of the front seat with the movable seats turned down adjacent thereto. Fig. 4 is an enlarged bottom plan view of the plate and turntable to which the support for the seat foundation is pivoted or hinged. Fig. 5 is a front view in elevation, the top of the support being broken away. Fig. 6 is an enlarged section of Fig. 5 on line $x$, also showing the entire supporting casting.

Referring to the several figures, the numeral 1 designates the front seat; 2, the rear seat; 3, 3, the sides of the vehicle; 4, 4, the open spaces or door openings at the opposite sides and which in this instance are located at the rear of the front seat; and 5 is the main floor.

In the example of the embodiment of the invention two movable seats are present arranged side by side each movable independently of the other and each of like construction and operation.

The numeral 6 designates a seat frame or foundation; 7, the upholstering or cushion preferably attached to the frame; 8, a folding back; 9, a rule hinge or hinges about which the back can turn from a vertical to a horizontal position, and vice versa; 10, a support for the seat frame preferably consisting of an integral casting with its top part rigidly secured to the bottom of the seat frame; 11, a hinge or pivotal connection at the lower end of the support uniting the same with the floor; 12, a supplemental floor or false floor located below the main floor; 13, a recess or slot made in the main floor in front of a support 10 substantially corresponding in area and depth with the area and thickness of the said support 10, whereby the said support may fit within the recess or slot and its rear surface lie in the plane of the top surface of the main floor when the seat is folded down; 14, a recess or recesses at the back of the front seat present when desired to receive the turned down seat; 15, the arm of the supporting casting provided with side extensions, see Fig. 3, secured by screws to the bottom surface of a seat frame; and 16 are webs for strengthening the support.

To permit of the rotation of the seat so it can face different directions the supporting casting is connected with the floor as follows: A plate 17 is firmly secured within a recess in the floor by screws passed through holes 18 of the plate. A relatively large circular opening 19 is provided at the center bounded by a top flange 20, a bottom flange 21 and strengthening webs radiating from the flanges. The interior curved surface of the bottom flange has screw threads 22, as shown. A slot 23 is provided at one edge of the plate within which the support 10 rests when it is turned down. Within the opening 19 of the plate is located a turntable 24 having its exterior edge threaded to match the threads 22 of the plate so the turntable may turn through the arc of a circle and still maintain its substantial relative position to said opening without displacement or rocking. To the turntable the lower end of the support is pivoted so it can move independently through an arc of 90 degrees only from an upright to a folding or a turned down position, or vice versa, when the slot 25 in the turntable registers with the slot 23 of the plate. In order that the support when in its vertical or turned up position will be held firmly and not rock sidewise, the lower end is provided with an extension 26 having beveled surfaces 27, 27 which engage the beveled surfaces 28, 28 at the bottom of the turntable and at opposite sides of the slot.

The pivotal connection constitutes a fulcrum and to secure ample strength the lower end of the support is provided with hollow extensions 30, 30 matching perforated bosses or lugs 31, 31 on the bottom of the turntable and a relatively large pin 32 is passed through both the extensions and lugs. The extension 26 is thus the arm of a lever moving about the pin as a fulcrum. Small open spaces may be provided at 33, 33 so that the support can slightly move sidewise when being raised and allow all the beveled interlocking surfaces 27, 28 to frictionally engage and thus hold the support and seat firmly without any possible rocking, especially when weight is applied to the seat. In fact, the major part of the weight of the occupant of the seat is at the rear of the pivotal connection and holds the seat firmly in position. The center of gravity of the seat frame also in its raised position is back of the pivotal point of the support and will thus automatically retain its raised position.

The turntable may positively be locked so it cannot turn relative to the plate when weight is upon the seat by providing a slot or kerf 34 in the body of the turntable which will allow the halves each side thereof and in front of the slot to spring apart under the wedging action of the lever or extension 26 engaging the beveled surfaces 28, 28, such action causing the threads on the turntable edge and on the plate to become frictionally interlocked so rotation is prevented. In other words, the weight of the occupant of the seat will lock the seat against rotation.

Obviously, the seat and support and turntable can be rotated through the medium of the engaging screw threads when the seat is in position for use and without excessive weight upon it so the seat will face in any direction. However, to limit the movement of the turntable there is added a clip 35 secured at one end to the plate by screws 36 and the other end bent to a U shape and lapped over the flanges of the plate and turntable so the clip will be engaged by one of the lugs 31 when the turntable is rotated. This arrangement also prevents the turntable being entirely unscrewed from the plate and the same along with the seat from being bodily removed.

The seats being in positions for occupancy and it being desired to open up a free passageway from the rear seat to a side entrance, the seat back is first folded down upon the seat or cushion, and then the entire seat and the support 10 are turned forwardly about the hinge or pivot 11 through an arc of 90 degrees which brings support 10 into the recess or slot 13 and the seat frame and upholstering to a vertical position adjacent to or in contact with the back of the fixed front seat, as will be obvious from an inspection of the drawings, wherein the dotted lines indicate in part the paths traveled by the movable parts or elements.

From the foregoing description taken in connection with the drawings it is clear that I have provided two movable seats either of which can be turned down adjacent the back or below the back of the front seat and to such a position that the entrance will not be obstructed. The level of the main floor is maintained so as not to interfere with the feet in entering or leaving the vehicle, the manipulations necessary to change a seat from one position to another are not intricate, a stable support is provided for a seat when in use, and when not in use the folded seat does not encroach to an objectionable degree upon the space between the front and rear fixed seats.

By reason of the novel attachment of the supporting casting to the floor a seat may be turned to face in any direction, and this mode of operation does not interfere with the folding or turning down of a seat to open a free passageway to and from the rear seat.

It is understood that part of the invention may be used to the exclusion of other parts without constituting a substantial departure.

What I claim is:

1. The combination with a vehicle having a front seat and a slot in the floor, of a movable seat frame and single support rigidly secured to the frame, a threaded turntable, a fixed threaded plate located at the end of the slot in the floor the threads thereof engaging the threads of the turntable, and the said support being pivoted to the turntable thus allowing the support and frame to rotate with the turntable about an axis, and said frame and support also being adapted to turn from a position adapted for use to positions at the back of the seat and within the slot in the floor.

2. The combination with a vehicle having a front seat and a slot in the floor, of a movable seat frame and single support rigidly secured to the frame, a threaded turntable, a slotted fixed threaded plate located at the end of the slot in the floor the threads thereof engaging the threads of the turntable, the said support being pivoted to the turntable thus allowing the support and frame to rotate with the turntable about an axis, and said frame and support also being adapted to turn from a position adapted for use to positions at the back of the seat and within the slots in the plate and in the floor.

3. The combination with a vehicle having a front seat and a slot in the floor, of a movable seat having a frame and single support rigidly secured to the frame, a threaded turntable, a fixed threaded plate located at the end of the slot in the floor the threads thereof engaging the threads of the turntable, the said support being pivoted to the turntable thus allowing the support and frame to rotate with the turntable about an axis, and means for locking the frame and support against rotation, the said frame and support also being adapted to turn from a position adapted for use to positions at the back of the seat and within the slot in the floor.

4. The combination with a vehicle having a front seat, of a movable seat frame and single support rigidly secured to the frame, a threaded turntable, a fixed threaded plate located at or in the floor the threads thereof engaging the threads of the turntable, the said support being pivoted to the turntable thus allowing the support and frame to rotate with the turntable about an axis, and means for automatically locking the turntable and seat against rotation, the said frame and support also being adapted to turn from a position adapted for use to positions at the back of the seat and at the floor.

5. The combination with a vehicle having a front seat, of a movable seat frame and single support rigidly secured to the frame, a threaded turntable having a slot, a fixed threaded plate located at or in the floor the threads thereof engaging the threads of the turntable, the said support being pivoted to the turntable thus allowing the support and frame to rotate with the turntable about an axis, and the said support being provided with a lever at one side of the pivotal connection and adapted to engage the said slot in the turntable, in substance as set forth.

6. The combination with a vehicle, of a movable seat comprising a frame or foundation, supporting means for the frame consisting of a single metallic element with an arm rigidly connected to the frame, a plate secured to the floor and having a central opening, a slotted turntable supported within the opening in the plate and rotatable relative to the plate, means for pivotally connecting the said supporting means at its lower end to the turntable thus allowing the supporting means and frame to turn on an axis and face different directions, and means for locking the turntable against rotation; the said metallic element being located at and rigidly secured to one edge or end of the frame so that when turned down the frame may occupy a substantially vertical position and the metallic element enter the slot in the turntable.

7. The combination with a vehicle, of a movable seat comprising a frame or foundation, supporting means for the frame consisting of a single metallic element with an arm rigidly connected to the frame, a plate secured to the floor and having a central opening, a slotted turntable supported within the opening in the plate and rotatable relative to the plate, means for pivotally connecting the said supporting means at its lower end to the turntable thus allowing the supporting means and frame to turn on an axis and face different directions, and means consisting of a wedge at the end of the supporting means engaging the slot in the turntable to limit the rearward movement of the seat frame and support when in use.

8. The combination with a vehicle, of a turntable rotatably supported by the floor, a movable seat comprising a frame or foundation, means for supporting the same which means is pivoted at its lower end to the turntable, and means for locking the turntable automatically so it cannot turn when weight is placed upon the seat.

9. The combination with a vehicle, of a slotted turntable rotatably supported by the floor, a folding seat comprising a supporting metallic element pivotally connected at its lower end to the turntable and provided with a wedge, and a seat frame rigidly connected to the top of the supporting element, the said wedge when the seat is in use engaging the slot in the turntable and locking the same against rotation.

10. The combination with a vehicle having front and rear seats and a floor with slots therein, of two slotted turntables rotatably supported by the floor, two folding seats each provided with supporting means pivoted to a turntable and adapted to be moved from a substantially vertical to a horizontal position and fit within a slot in the turntable and a slot in the floor so as to maintain the normal level of the floor adjacent the entrances to the vehicle, and means for automatically locking each seat and support and turntable against rotation by the application of weight to the seat when in an upturned position.

11. The combination with a vehicle, of a plate in the floor, a slotted turntable rotatably supported by the plate, and a folding seat with a single supporting element pivotally secured to the turntable; the lower end of said supporting element being extended beneath the turntable and pivotal connection and when the seat is in a raised position engaging the turntable and limiting the rearward travel of the seat.

In testimony whereof I affix my signature in presence of two witnesses.

GEORGE W. WELLS.

Witnesses:
JAMES H. WALKER,
ADDIE L. TRUE.

Copies of this patent may be obtained for five cents each, by addressing the "Commissioner of Patents, Washington, D. C."